United States Patent

Suda

[15] 3,648,548
[45] Mar. 14, 1972

[54] METHOD FOR PRODUCING CUTTING TOOLS

[72] Inventor: Humio Suda, Nagoya, Japan
[73] Assignee: Toyoda Koki Kabushiki Kaisha, Kariya, Aichi Prefecture, Japan
[22] Filed: May 15, 1970
[21] Appl. No.: 37,657

[30] Foreign Application Priority Data

Aug. 6, 1969 Japan..................................44/61944

[52] U.S. Cl. ..........................................76/101 R, 29/470.3
[51] Int. Cl...........................................................B21k 21/00
[58] Field of Search..................................76/101; 29/470.3

[56] References Cited

UNITED STATES PATENTS 3,134,169  5/1964  Hollander et al. .....................29/470.3
3,497,942  3/1970  Weiss...................................29/470.3
1,904,568  4/1933  Taylor............................76/101 A UX

*Primary Examiner*—Bernard Stickney
*Attorney*—Connolly and Hutz

[57] ABSTRACT

Method for producing cutting tools comprises steps of pressing blade metal blank against base metal blank while continuously rotating one of blanks relative to other for purpose of developing frictional heat. Relative rotation of blade and base metal blanks is terminated after sufficient heat is developed but pressing force is maintained. Blade and base metals are joined together to form rough forging of cutting tool. Rough forging is forged to draw it along juncture of blade and base metals. Portions of blade and base metals are cut away to form cutting tool.

1 Claims, 6 Drawing Figures

METHOD FOR PRODUCING CUTTING TOOLS

BACKGROUND OF THE INVENTION

The present invention relates to a method for producing cutting tools, and more particularly to a method for producing cutting tools having composite metal construction.

In accordance with the tool manufacturing method commonly used today, the metal material intended for use as the base member of a cutting tool is shaped by thin platework or forging. A substantial part of the shaped base member is subjected to machining to thereby shape the base member to the desired configuration. Then, a blade metal made of alloy steel, such as tool steel or die steel, or of a sintered alloy, is brazed to the contoured base member. The assembly is then subjected to machining and heat treatment to complete a finished cutting tool.

Conventional methods, of the type described above, employ brazing for welding purposes and this brazing operation has many significant drawbacks. For instance, the equipment needed for the brazing operation requires significant initial expenditures. Also, in the case of utilizing an alloy steel, such as die steel, for example, there is a strong possibility that cracks will be produced due to differences in the mechanical properties of the blade and base metal materials. In order to inhibit the formation of such cracks it is necessary to use different blade metals which have an inferior hardness in comparison to die steel. The resultant product is less durable and has an inferior quality.

The brazing operation cannot be performed unless the juncture between the blade metal and the base metal has been shaped into a desired configuration. Also, difficulties are encountered in manufacturing a tool which has a complicated configuration particularly at its edge portion. Any presence of oil, oxides, dust or other impurities at the juncture between the blade metal and the base metal can cause an imperfect weld. Accordingly, methanol is often used to clean the faces of the metals to be joined. Conventional brazing methods also require the application of flux to increase the fluidity of the brazing operation. The preparatory steps preceding the actual brazing operation are also time consuming and complicated. Additionally, the brazing or soldering operation requires the use of relatively expensive materials such as copper or silver solder. The flux must be cleaned away after the brazing operation or else subsequent vitrification of the flux would make it extremely difficult to remove. In some instances, pickling or mechanical treatment such as shot or sandblasting is required. Sometimes the mechanical bond between the blade and base metals is very weak due to voids at the interface.

Recently, a high-frequency induction heating method was developed for effectively practicing the brazing for a cutting tool. In this method, an electric current of high frequency is applied to a heating coil to produce an induced current on the surface of the article to be brazed. Only the surface of the article to be joined is heated to the point where the solder is melted to effect the desired joining. It is essential to apply a constant pressure to the blade and base metal members so that the solder flows uniformly over the entire interface. According to the above high-frequency induction heating method, the structure of the required apparatus is simplified and heating is effected without a flame being produced. This operation enables clean and easy work, and substantially eliminates quality defects since only the interface is heated. Also, since the entire brazing operation is completed within a few seconds, this method is suited for mass production. However, the fundamental principles of the brazing operation are the same as more conventional practices. Thus, the high-frequency heating method also produces the same adverse effects described above in conjunction with the more conventional brazing operations.

Accordingly, it is an object of the present invention to provide a method for producing cutting tools of composite metals without the above-described adverse effects which are inherent with brazing operations.

SUMMARY OF THE INVENTION

In accordance with the present invention a method is provided for producing cutting tools comprising the steps of pressing a blade metal blank against a base metal blank while continuously rotating one of the blanks relative to the other for the purpose of developing frictional heat. The relative rotation of the blade and base blanks is terminated after sufficient heat is developed but the pressing force is maintained. The blade and base metals are joined together to form a rough forging of a cutting tool. The rough forging is forged to draw it along the juncture of the blade and base metals. Finally, portions of the blade and base metals are cut away to form a cutting tool.

BRIEF DESCRIPTION OF THE DRAWING

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

Figure 1:
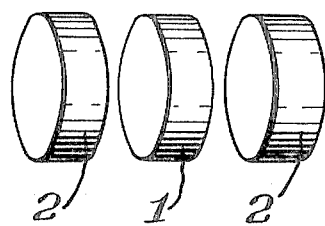
FIg. 1 is a perspective view of the material utilized in the method of the present invention.

Referring in more particularity to the drawing, FIG. 1 illustrates in perspective view the metal blank material utilized for producing a cutting tool according to the method of the present invention. In this regard, a blade metal blank 1, such as die steel, and base metal blanks 2, such as carbon steel, are formed into cylinders, such as shown in FIG. 1. Both the blade metal blank 1 and the base metals 2 may be shaped into other configurations such as round bar-shaped pieces or polygonal plate-shaped configurations.

Figure 2:
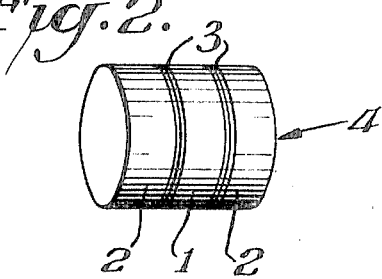
FIG. 2 is a perspective view illustrating the material of FIG. 1 after friction forging according to the present invention.

The end face of one of the base metal blanks 2 is joined to one of the end faces of the blade metal blank 1. This is accomplished by rotating the blade metal blank and one of the base metal blanks relative to one another while pressing the blanks together. This operation is controlled so that the average relative surface velocity is within the range of 1 to 4.5 m./sec. and the pressing force is within the range of 1 to 12 kg./mm². The interface of the blade metal blank 1 and the base metal blank 2 is heated by friction until it is turned into an incandescent molten state. When this condition occurs the rotational motion between the blanks is suddenly terminated while the pressing force is still maintained. The blade metal blank 1 and the base metal blank 2 are then cooled under continued application of the pressing force until the metals are joined together. The resultant joining between the blade and base metals is substantially the same as achieved by forging and the resultant product can be termed a rough forging. Upon completion of the friction welding of one of the base metal blanks 2 to one face of the blade metal blank 1 the same operation is conducted to bond the other base metal blank 2 to the other face of the blade metal blank 1. As shown in FIG. 2, the base metal blanks 2 are welded on the opposite faces of the blade metal blank 1 to produce a rough forging 4 of a cutting tool. The rough forging 4 is subsequently subjected to free forging or stamp forging operations to thereby finish the forging 4 into the desired cutting tool.

Figure 3:
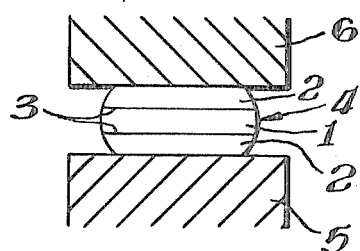
FIG. 3 is a longitudinal sectional view showing the material of FIG. 2 subjected to a free forging operation.

FIG. 3 illustrates the situation where the rough forging 4 is subjected to free forging techniques. In this regard, the forging 4 is placed upon an anvil 5 in such a manner that the joined faces 3 of the forging 4 are parallel to the anvil surface. A ram 6 is urged downwardly against the anvil to effect the free forging of the rough forging 4 into a cutting tool.

Figure 4:
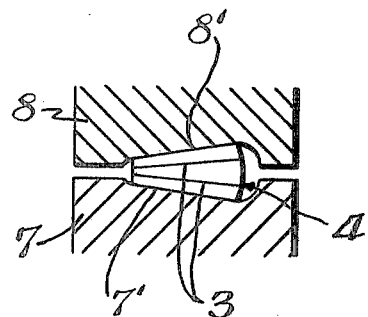
FIG. 4 is a longitudinal sectional view showing the material of FIG. 2 subjected to a stamp forging operation.

FIG. 4 illustrates the situation where the rough forging 4 is subjected to a stamp forging operation. Here, the rough forging 4 is placed at a predetermined location on the lower die block 7 in such a manner that the joined faces 3 of the forging 7 are substantially parallel to the upper face 7' of the lower die block 7. The upper die block 8 has a lower face 8' with a shape symmetrical to that of the upper face 7' of the lower die block 7. Downward pressing motion of the upper block 8 effects the stamp forging of the forging 4 to thereby form the desired cutting tool. The stamp forging operation is particularly desirable for shaping cutting tools having complicated configurations.

Figure 5:
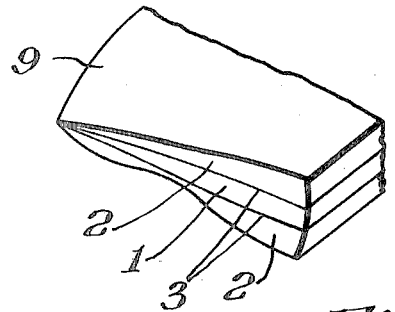
FIG. 5 is a perspective view illustrating a cutting tool produced by the method of the present invention.

The product of FIG. 5 is an example of a cutting tool produced in the above-described manner. The blade metal 1 is in the center and the base metals 2 are located on opposite sides of the blade metal. The base metals are drawn parallel to the joined faces 3, this is particularly evident at the edge part 9 of the tool. Both the blade metal 1 and the base metal 2 can be formed quite thin while being solidly joined to one another. In other words, since the hard blade metal 1 is joined in a sandwiched relationship between the softer base metal 2, the blade metal 1 is drawn in company with the base metals by the forging operation. The blade metal is in a state of being held and supported between the base metals on both sides thereof. As shown in FIG. 5, the base metals 2 on opposite sides of the blade metal 1 are formed into substantially equal thicknesses.

Figure 6:
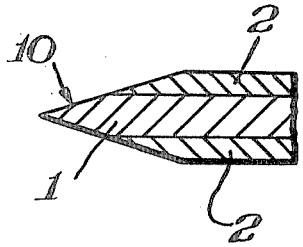
FIG. 6 is a sectional view illustrating the cutting tool of FIG. 5 after it is machined.

The forged article shown in FIG. 5 can be machined by cutting away selected portions until the cutting tool appears as shown in FIG. 6. This is accomplished by cutting away the base metals 2 on opposite sides of the blade and sharpening the blade to form a cutting edge 10. This completes the method of tool manufacture. Thus, according to the method of the present invention, the cutting edge is formed by sharpening the blade metal while the base metals are used to provide protection on both sides of the blade. Cutting tools produced by the present invention cut clean and also have a high resistance to breaking and bending under significantly strong impacts. Tools manufactured according to the present invention are particularly useful for manufacturing axes, swords, and the like.

In the process of the present invention, it should be noted that the blade metal 1 and the base metal 2 are directly contacted along the joining faces 3. They are frictionally joined together under pressure by rotating one of them relative to the other. Accordingly, there is no need for solder material. This means a saving in time and labor when compared to the soldering techniques utilized prior to the present invention. The present invention is also characterized by the fact that the undesirable impurities are swept away by utilizing centrifugal force during the relative rotation of the metal blanks to be joined together. Thus, little if any cleaning medium is needed. As compared with conventional brazing methods, the present process has many significant advantages in addition to those mentioned above. The number of steps required in the manufacturing process is markedly reduced with the present invention. Also, there is no need for any auxiliary materials with the present invention. It is also possible to economically produce excellent cutting tools on a mass production scale. Both the base and blade metals can be shaped to any desired configuration by a forging operation regardless of the complexity of the tool being produced. This is possible since according to the present invention both metals after being joined together are integrally forged and simultaneously shaped. The bond between the metals is such that there is little if any possibility of the blade and base metals becoming separated.

I claim:

1. A method for producing cutting tools comprising a first step of pressing a blade metal blank against a first base metal blank while continuously rotating one of the blanks relative to the other for developing frictional heat, a second step of terminating the pressing force whereby the first base metal blank is joined to one face of the blade metal blank, a step of subjecting a second base metal blank and the other face of the blade metal blank to the above first and second steps whereby the blade metal blank is joined to and between the first and second base metal blanks to form a rough forging, next, subjecting the rough forging to a forging operation that draws the rough forging along the juncture between the blade and base metals, and then cutting away the blade and base metals to form a cutting edge on the blade metal blank.

* * * * *